(12) United States Patent
Dumoulin et al.

(10) Patent No.: US 10,176,219 B2
(45) Date of Patent: Jan. 8, 2019

(54) INTERACTIVE REFORMULATION OF SPEECH QUERIES

(71) Applicant: Microsoft Technology Licensing, LLC, Redmond, WA (US)

(72) Inventors: Benoit Dumoulin, Sunnyvale, CA (US); Ali Ahmadi, Bellevue, WA (US); Sarangarajan Parthasarathy, Sunnyvale, CA (US); Nick Craswell, City Center, WA (US); Umut Ozertem, San Carlos, CA (US); Milad Shokouhi, Cambridge (GB); Karthik Raghunathan, Sunnyvale, CA (US); Rosie Jones, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 14/657,568

(22) Filed: Mar. 13, 2015

(65) Prior Publication Data
US 2016/0267128 A1 Sep. 15, 2016

(51) Int. Cl.
*G06F 17/30* (2006.01)
*G10L 15/22* (2006.01)
*G10L 25/48* (2013.01)
*G10L 15/26* (2006.01)

(52) U.S. Cl.
CPC .. *G06F 17/30401* (2013.01); *G06F 17/30654* (2013.01); *G06F 17/30976* (2013.01); *G10L 25/48* (2013.01); *G10L 15/26* (2013.01)

(58) Field of Classification Search
None
See application file for complete search history.

(56) References Cited

U.S. PATENT DOCUMENTS

| 5,500,920 A | 3/1996 | Kupiec |
| 6,564,213 B1 | 5/2003 | Ortega et al. |
| 6,615,172 B1 | 9/2003 | Bennett et al. |
| 7,027,987 B1 | 4/2006 | Franz et al. |
| 7,672,846 B2 | 3/2010 | Washio et al. |

(Continued)

OTHER PUBLICATIONS

Nuance, Dragon NaturallySpeaking 13 Installation Guide and User Guide, 2014, accessed Apr. 27, 2017 at http://www.nuance.com/content/dam/nuance/en_us/collateral/dragon/guide/dns13_userguide.pdf.*

(Continued)

*Primary Examiner* — William Spieler

(57) ABSTRACT

Methods and systems are provided for providing alternative query suggestions. For example, a spoken natural language expression may be received and converted to a textual query by a speech recognition component. The spoken natural language expression may include one or more words, terms, and/or phrases. A phonetically confusable segment of the textual query may be identified by a classifier component. The classifier component may determine at least one alternative query based on identifying at least the phonetically confusable segment of the textual query. The classifier may further determine whether to suggest the at least one alternative query based on whether the at least one alternative query is sensical and/or useful. When it is determined to suggest the at least one alternative query, the at least one alternative query may be provided to and displayed on a user interface display.

19 Claims, 13 Drawing Sheets

(56) References Cited

U.S. PATENT DOCUMENTS

| | | | |
|---|---|---|---|
| 7,672,931 | B2 | 3/2010 | Hurst-hiller et al. |
| 8,024,179 | B2 | 9/2011 | Pulz et al. |
| 8,260,809 | B2 | 9/2012 | Platt et al. |
| 8,326,627 | B2 | 12/2012 | Kennewick et al. |
| 8,521,526 | B1* | 8/2013 | Lloyd ............... G10L 15/197 704/236 |
| 8,554,755 | B2 | 10/2013 | Richardson et al. |
| 8,589,164 | B1 | 11/2013 | Mengibar et al. |
| 8,793,130 | B2 | 7/2014 | Wang et al. |
| 2009/0006345 | A1* | 1/2009 | Platt ................ G06F 17/276 |
| 2009/0112593 | A1* | 4/2009 | Konig ............ G06F 17/30392 704/251 |
| 2009/0248627 | A1 | 10/2009 | Shahshahani et al. |
| 2011/0145214 | A1 | 6/2011 | Zhang et al. |
| 2014/0188899 | A1* | 7/2014 | Whitnah ........ G06F 17/30646 707/749 |
| 2015/0243278 | A1* | 8/2015 | Kibre ................ G10L 15/075 704/243 |

OTHER PUBLICATIONS

PCT International Search Report and Written Opinion in PCT/US2016/021895, dated Sep. 7, 2016, 18 pages.

"Dragon Naturally Speaking: Installation and User Guide," http://www.nuance.com/ucmprod/groups/dragon/@web-enus/documents/collateral/nc 025216.pdf, Jan. 1, 2012, 290 pages.

Jiang, et al., "How Do Users Respond to Voice Input Errors? Lexical and Phonetic Query Reformulation in Voice Search", In Proceedings of 36th International ACM SIGIR conference on research and development in Information Retrieval, Jul. 28, 2013, 10 pages.

Jeng, et al., "Users' Perceived Difficulties and Corresponding Reformulation Strategies in Voice Search", In Proceedings of 7th Annual Symposium on Human-Computer Interaction and Information Retrieval, Oct. 3, 2013, 4 pages.

"Second Written Opinion Issued in PCT Application No. PCT/US2016/021895", dated Dec. 19, 2016, 9 Pages.

"International Preliminary Report on Patentability Issued in PCT Application No. PCT/US2016/021895", dated May 24, 2017, 10 Pages.

* cited by examiner

INTERACTIVE REFORMULATION OF SPEECH QUERIES

BACKGROUND

Searching applications may receive search queries in the form of text and/or speech/voice. Mistakes in text queries usually happen when a user is typing a search query. For example, a user may misspell a word when typing. In this scenario, a searching application may identify the misspelled word and provide the user with an alternative search query that includes a correction of the misspelled word. Voice queries, however, are often compared against a spell-corrected language model and the transcripts of submitted queries are generally correctly spelled. However, the speech recognizer used to transcribe the voice query into text may misrecognize the voice input resulting in submitting a query that has a meaning different than what was intended by a user. Thus, while the transcribed word may be correctly spelled, it may not be the correct word, i.e., the word actually spoken or intended by the speaker. In this regard, the misrecognized voice input is more than just a misspelled word mistake. As such, characteristics and typical mistakes of speech recognition outputs are very different than the characteristics and typical mistakes of typed queries.

It is with respect to these and other general considerations that embodiments have been made. Also, although relatively specific problems have been discussed, it should be understood that the embodiments should not be limited to solving the specific problems identified in the background.

SUMMARY

In summary, the disclosure generally relates to interactive reformulation of voice (e.g., speech) queries. More particularly, the disclosure relates to methods and systems for providing alternative query suggestions. For example, a spoken natural language expression may be received and converted to a textual query by a speech recognition component. The spoken natural language expression may include one or more words, terms, and phrases. A phonetically confusable segment of the textual query may be identified by a classifier component. The classifier component may determine whether to suggest at least one alternative query based on identifying at least the phonetically confusable segment of the textual query. When it is determined to suggest the at least one alternative query, the at least one alternative query may be provided to and displayed on a user interface display.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. Embodiments may be practiced as methods, systems or devices. Accordingly, embodiments may take the form of a hardware implementation, an entirely software implementation or an implementation combining software and hardware aspects. The following detailed description is therefore not to be taken in a limiting sense, and the scope of the present disclosure is defined by the appended claims and their equivalents.

The present disclosure generally relates to a voice-recognition system for interactive reformulation of voice (e.g., speech) queries. In one example, the voice-recognition system may be configured to provide alternative query suggestions to a user of the voice-recognition system. Existing techniques for providing alternative query suggestions include solutions for identifying mistakes in text queries when a user is typing a search query. For example, a user may misspell a word when typing. In existing systems, a searching application may identify the misspelled word and provide the user with an alternative search query that includes a correction of the misspelled word. Existing voice-recognition systems may compare voice queries against a spell-corrected language model and the transcripts of submitted queries are generally correctly spelled. However, speech recognizers that are used to transcribe the voice query into text for submitting the query may misrecognize the voice input resulting in submitting a query that has a meaning different than what was intended by a user. For example, while transcribed words or phrases may be correctly spelled, these transcribed words or phrases may not be the words or phrases intended by the user. Accordingly, embodiments described herein include a voice-recognition system for providing alternative query suggestions for voice queries. In embodiments, the voice-recognition system provides interactive reformulation of voice queries.

Figure 1:
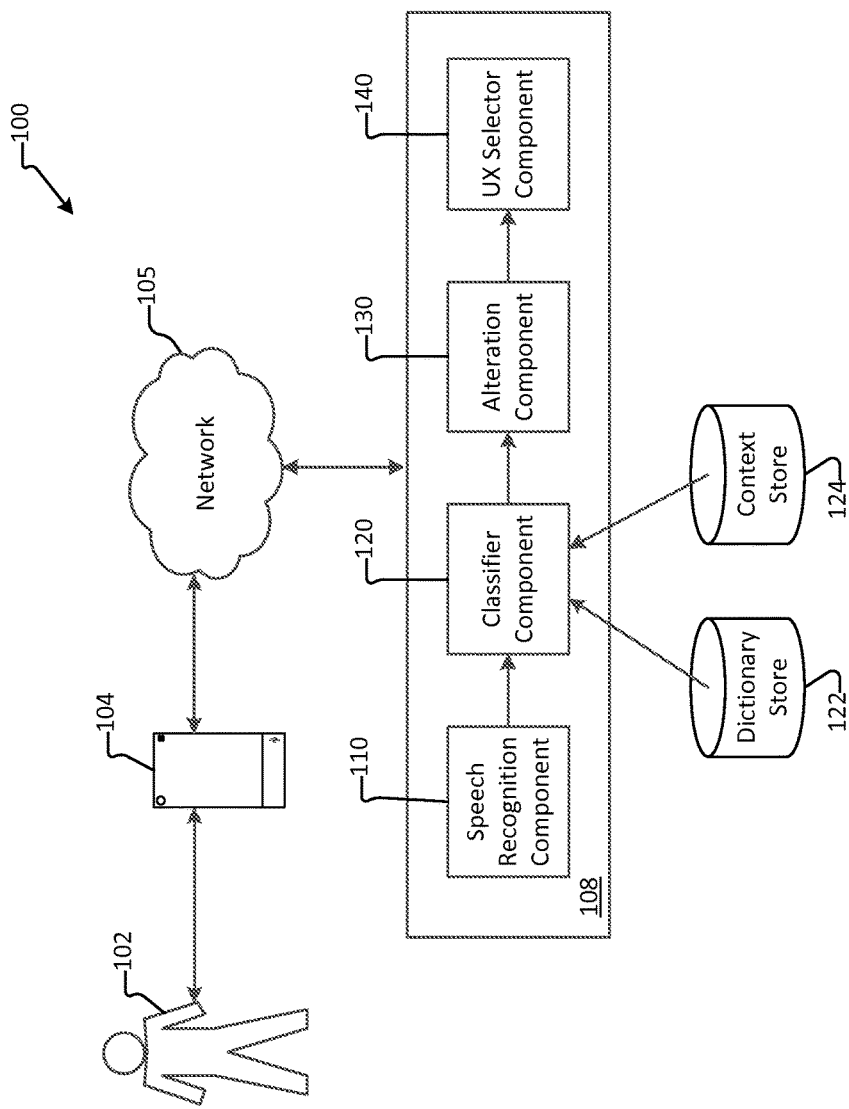
FIG. 1 illustrates an exemplary voice-recognition system implemented at a server computing device for interactive reformulation of voice queries, according to an example embodiment.

With reference to FIG. 1, one aspect of a voice-recognition system 100 for interactive reformulation of voice queries is illustrated. In aspects, the voice-recognition system 100 may be implemented on a client computing device 104. In a basic configuration, the client computing device 104 is a handheld computer having both input elements and output elements. The client computing device 104 may be any suitable computing device for implementing the statistical system 100 for contextual language understanding. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device for implementing the statistical system 100 for contextual language understanding may be utilized.

In aspects, as illustrated in FIG. 1, the voice-recognition system 100 may be implemented on a server computing device 108. The server computing device 108 may provide data to and from the client computing device 104 through a network 105. In one aspect, the network 105 is a distributed computing network, such as the internet. In aspects, that voice-recognition system 100 may be implemented on more than one server computing device 108, such as a plurality of server computing devices 108. As discussed above, the server computing device 108 may provide data to and from the client computing device 104 through the network 105. The data may be communicated over any network suitable to transmit data. In some aspects, the network 105 is a computer network such as the internet. In this regard, the network 105 may include a Local Area Network (LAN), a Wide Area Network (WAN), the Internet, wireless and wired transmission mediums. In this regard, a spoken natural language expression may be received at the client computing device 104 and transmitted over the network 105 for processing by the voice-recognition system 100 at the server computing device 108.

As illustrated in FIG. 1, the voice-recognition system 100 may include a speech recognition component 110, a classifier component 120, an alternation component 130, a UX selector component 140, a dictionary store 122, and a context store 124. The various components may be implemented using hardware, software, or a combination of hardware and software. The voice-recognition system 100 may be configured to receive and process spoken natural language expressions. In one example, a natural language expression may include phrases, words, and/or terms in the form of a spoken language input (e.g., a user voice query and/or voice request). In this regard, the speech recognition component 110 may be configured to receive the spoken natural language expression. In aspects, the speech recognition component 110 may be configured to convert the spoken natural language expression to a textual query. For example, the speech recognition component 110 may include standard speech recognition techniques known to those skilled in the art such as "automatic speech recognition" (ASR), "computer speech recognition", and "speech to text" (STT). In some cases, the speech recognition component 110 may include standard text to speech techniques known to those skilled in the art such as "text to speech" (TTS). In one example, the textual query is provided to a search engine, for example, to obtain search results.

One skilled in the art would recognize that speech recognition component 110 may include one or more various different types of speech recognition and/or text recognition components. In some cases, the speech recognition component 110 is configured to receive the spoken natural language expression and output a plurality of n-best textual query candidates (e.g., an n-best list of candidates) of the received spoken natural language expression. For example, the speech recognition component 110 may receive the spoken natural language expression "install apple keychain," and output a first textual query candidate including, "install apple keychain," and a second textual query candidate including, "install apple kitchen." The n-best list of textual query candidates may be generated using a single ASR, SST, or TTS, or using multiple ASRs, SSTs, or TTSs. The speech recognition component 110 may output speech recognition confidence scores associated with the n-best list of textual query candidates. For example, each speech recognition textual query candidate output by the speech recognition component 110 may have an associated speech recognition confidence score. The speech recognition confidence score may indicate a confidence level of the accuracy of converting the spoken natural language expression to a textual query.

In aspects, the textual query output by the speech recognition component 110 may be sent to the classifier component 120 for processing. In some cases, the textual query is a best guess textual query candidate. For example, a best guess textual query candidate may be a textual query candidate in the n-best list of textual query candidates that has the highest associated speech recognition confidence score. In other cases, the n-best list of textual query candidates may be sent to the classifier component 120 for processing. In one aspect, the classifier component 120 may be configured to identify at least a phonetically confusable segment of the textual query. Phonetically confusable may refer to homophone ambiguities. Homophone ambiguities are ambiguities found in speech, but not found in text (e.g., typing). For example, a homophone is a word that is pronounced the same as another word but differs in meaning. A homophone may also be a word that is pronounced the same as another word but differs in spelling. For example, the words, "whales," and "wales" are homophones. A phonetically confusable segment of the textual query may be any portion of the textual query including a word, term, or phrase of the textual query.

In aspects, identifying at least the phonetically confusable segment of the textual query may include using at least one of metaphones, historical data, and a plurality of speech recognition confidence scores. For example, using metaphones may provide a measure of phonetic similarity among segments of queries by computing the Levenshtein Distance over the metaphones of at least two queries. As discussed above, the voice-recognition system 100 includes a dictionary store 122 and a context store 124. As such, historical data may include the dictionary store 122 and/or the context store 124. In aspects, the dictionary store 122 may include homophones, session pairs, and the like. As discussed above, homophones are words that are pronounced the same as another word but with a different meaning and/or spelling. In this regard, the dictionary store 122 may be used to identify at least the phonetically confusable segment of the textual query. For example, the classifier component 120 may search the dictionary store 122 for terms that are phonetically similar, homophones, and/or have a similar hash value. As such, when the classifier component 120 identifies at least the phonetically confusable segment of the textual query, the classifier component 120 may compare terms and/or segments of the textual query with data stored in the dictionary store 122 to identify homophones, phonetically similar terms and/or words having similar hash values, for example. In some cases, hash values may be used to identify voice queries that are phonetically similar. For example, phonetically similar queries (e.g., queries that sound similar) may have similar hash values. In some cases, phonetically similar queries may have identical hash values. In this regard, identifying an identical and/or similar hash value in the dictionary store 122 may indicate a phonetically confusable segment of the textual query.

As discussed above, the dictionary store 122 may include session pairs. A session pair may include a pair of queries issued by a user 102 during a session between a user 102 and the voice-recognition system 100. A session may include a conversation between a user and an application (e.g., a digital assistant application) of the voice-recognition system 100. The session may start when the application is activated and a user starts speaking and end when the application is de-activated. In aspects, the session pair may include a pair of spoken natural language expressions, a spoken natural language expression and a reformulated query, and/or a pair of alternative queries, to name a few. As such, in one example, a session pair may include a voice-query and a reformulated text query. For example, a user 102 may issue a spoken natural language expression, "U2," and the speech recognition component 110 may convert the spoken natural language expression to the textual query, "youtube." The voice-recognition system 100 may determine to issue the query "youtube" and return search results associated with the query "youtube" to the user 102. During the same session, the user 102 may reformulate the returned query "youtube" to "U2" via text (e.g., typing "U2"). In this example, the voice-recognition system 100 may store the voice-query "youtube," and the reformulated text query, "U2," in the dictionary store 122 as a session pair. In turn, the classifier component 120 may identify, "youtube," as a phonetically confusable segment of a textual query by identifying the voice-query, text-query session pair "youtube," and "U2" in the dictionary store 122. In other examples, as described below, the user 102 may reformulated the returned query "youtube" to "U2" via speech.

In another example, the classifier component 120 may utilize the context store 124 to identify a phonetically confusable segment of the textual query. For example, the context store 124 may include session history data gathered during a session and/or a plurality of sessions. Using the example described above, a user 102 may issue and intend a spoken natural language expression, "U2," and the speech recognition component 110 may convert the spoken natural language expression to the textual query, "youtube." The voice-recognition system 100 may determine to issue the query "youtube" and return search results associated with the query "youtube" to the user 102. During the same session, the user 102 may interactively reformulate the returned query "youtube" to "U2" via voice (e.g., speaking "U2"). In this regard, the speech recognition component 110 may receive a second spoken natural language expression, "U2" The speech recognition component 110 may convert the second spoken natural language expression to the textual query, "youtube," again. The voice-recognition system 100 may determine that the first spoken natural language expression (e.g., the textual query "youtube" output by the speech recognition component) was issued recently (e.g., 10 seconds) before the second spoken natural language expression (e.g., the reformulated voice query "U2"), received no or little engagement (e.g., no clicks), and that the first and second spoken natural language expressions sound similar. The voice-recognition system 100 may further determine that the user 102 did not engage with (e.g., clicks, scrolling) any search results associated with the first spoken natural language expression returned to the user 102. In this regard, the first and second spoken natural language expressions that sound similar (e.g., the textual query outputs of "youtube") and the click data associated with the first spoken natural language expression may be stored in the context store 124. Two spoken natural language expressions that result in the same converted textual query and have associated click data that indicates a user 102 did not click on any search results may indicate that the textual query has at least a phonetically confusable segment. In turn, the classifier component 120 may identify, "youtube," as a phonetically confusable segment of a textual query by identifying the voice-query, voice-query session pair "youtube," and "youtube" and the associated click data in the context store 124.

As discussed above, the phonetically confusable segment of the textual query may be identified by using at least one of metaphones, historical data, and a plurality of speech recognition confidence scores. The speech recognition component 110 may output speech recognition confidence scores associated with the n-best list of textual query candidates. In this regard, the classifier component 120 may determine whether a speech recognition confidence score meets a threshold. In one example, when it is determined that the speech recognition confidence score meets the threshold, the textual query associated with the speech recognition confidence score that meets the threshold may have a high confidence score. A high confidence score may indicate to the classifier component 120 that the textual query does not have a phonetically confusable segment. In other examples, when it is determined that the speech recognition confidence score does not meet the threshold, the textual query associated with the speech recognition confidence score may have a low confidence score. A low confidence score may indicate to the classifier component 120 that the textual query has a phonetically confusable segment. The threshold for determining high or low confidence scores may be determined by any suitable means. While different speech recognition components may produce different ranges of confidence scores, these confidence scores often follow particular distributions whereby bottom percentiles may be used to set thresholds. Additionally or alternatively, confidence scores from different speech recognition components may be normalized for comparison and/or for setting thresholds to determine high or low confidence scores. In other examples, the classifier component 120 may analyze the n-best list of textual query candidates and their associated speech recognition confidence scores to identify a phonetically confusable segment of the textual query. For example, the classifier component 120 may determine the consistency of the speech recognition component 110 issuing a textual query candidate to a user 102. A textual query that is issued to a user 102 at low consistency may indicate that the textual query candidate includes a phonetically confusable segment.

When the classifier component 120 identifies at least a phonetically confusable segment in the textual query, the classifier component 120 may determine whether to suggest at least one alternative query based on a speech recognition confidence score. For example, as discussed above, the speech recognition component 110 may output speech recognition confidence scores associated with the n-best list of textual query candidates. In this regard, the classifier component 120 may determine whether a speech recognition confidence score meets a threshold. In one example, when it is determined that the speech recognition confidence score meets the threshold, the textual query associated with the speech recognition confidence score that meets the threshold may have a high confidence score. In some cases, the classifier component 120 may not suggest at least one alternative query when the textual query has a high confidence score (e.g., a speech recognition confidence score that meets the threshold). In aspects, when the classifier component 120 determines not to suggest at least one alternative query, the classifier component 120 may provide the textual query and search results associated with the textual query to the user 102. In some cases, the textual query provided to the user 102 is a best guess textual query candidate. When the textual query has a low confidence score (e.g., a speech recognition confidence score that does not meet the threshold), the classifier component 120 may utilize historical data stored in the dictionary store 122 and/or the context store 124 to determine whether to suggest at least one alternative query. For example, the textual query "youtube" may be associated with a low confidence score. Additionally, the dictionary store 122 may include historical data including session features. For example, the dictionary store 122 may include the session pair of queries "U2" and "youtube." In this example, the query "youtube" is the textual query output by the speech recognition component 110 and the query "U2" is the reformulated query. As such, when the classifier component 120 identifies a textual query with a low confidence score (e.g., "youtube") that is identified with a session pair, such as the one described above, the classifier component 120 may suggest at least one alternative query (e.g., "U2").

In other aspects, the classifier component 120 may determine whether to suggest at least one alternative query based on whether the at least one alternative query is sensical. Sensical may refer to whether the combination of terms, words, or phrases in an alternative query makes logical sense. In one case, an alternative query that makes logical sense may refer to whether the alternative query would facilitate disambiguation between the textual query and the at least one alternative query. For example, if the textual query output by the speech recognition component 110 is, "picture of wales" suggesting the alternative query, "picture of whales," is a sensical alternative query that would help a user 102 disambiguate between the textual query and the alternative query. However, in an example where the textual query output by the speech recognition component 110 is "map of wales," suggesting the alternative query, "map of whales," is not a sensical alternative query that would help a user 102 disambiguate between the textual query and the alternative query. In this regard, when it is determined by the classifier component 120 that the at least one alternative query is sensical, the classifier component 120 may suggest the at least one alternative query.

In other aspects, the classifier component 120 may determine whether to suggest at least one alternative query based on whether the at least one alternative query is useful. Usefulness may refer to whether a user 102 would find the at least one alternative query helpful and/or interesting. For example, if the textual query output by the speech recognition component 110 is a first name and a last name that the speech recognition component 110 labels as an actress, suggesting an alternative query of a first name and a last name (e.g., that may be phonetically similar to the textual query) of a person who is labeled as not famous may not be helpful and/or interesting. In this regard, even though an alternative query may be phonetically similar to the textual query output by the speech recognition component 110, the classifier component 120 may determine that the at least one alternative query would not be helpful and/or interesting to the user (even if the alternative query is a valid search query and would provide valid associated search results). However, when it is determined by the classifier component 120 that the at least one alternative query would be useful (i.e., helpful and/or interesting), the classifier component 120 may suggest the at least one alternative query.

In other aspects, the classifier component 120 may determine whether to suggest at least one alternative query based on a similarity of search results. For example, the classifier component 120 may compare search results associated with the textual query output by the speech recognition component 110 with search results associated with the at least one alternative query. If the search results are the substantially the same or similar, the classifier component 120 may determine not to suggest at least one alternative query. For example, if the textual query output by the speech recognition component 110 is "youtube" and the at least on alternative query is "you tube," the search results for both queries may be substantially the same. Alternatively, if the search results are different, the classifier component 120 may determine to suggest the at least one alternative query. In some cases, determining whether to suggest at least one alternative query based on a similarity of search results may include computing an overlap between the search results associated with the textual query output by the speech recognition component 110 and the search results associated with the at least one alternative query. For example, the overlap between the search results associated with the textual query output by the speech recognition component 110 and the search results associated with the at least one alternative query may include a number of common search results. In some examples, the classifier component 120 may suggest at least one alternative query when the number of common search results is low (e.g., the overlap between the search results is low). In some cases, a threshold may be used to determine whether the number of common search results is low (e.g., such that the classifier component 120 decides to suggest at least one alternative query). In one case, the threshold may be based on rules of the classifier component 120 indicating when an alternative query should be suggested and should not be suggested. In one example, a rule may include a statement such as, "if there is less than 10% overlap, suggest an alternative query." This example is exemplary only and should not be considered as limiting. Any suitable rule and/or combination of rules for setting a threshold and/or determining whether to suggest an alternative query may be utilized.

It is appreciated that any combination of the above-described methods/features may be used to determine whether to suggest at least one alternative query based on identifying the at least phonetically confusable segment of the textual query. For example, the classifier component 120 may determine that the at least one alternative query is both sensical and useful and decide to suggest the at least one alternative query. In another example, the classifier component 120 may determine that the at least one alternative query provides high number of search results that are different from the search results associated with the textual query output by the speech recognition component 110 and decide to suggest the at least one alternative query. This is exemplary only and should not be considered as limiting. Any suitable combination of data, features, and/or methods for determining whether to suggest at least one alternative query based on identifying the at least phonetically confusable segment of the textual query may be utilized.

As discussed above, at least one alternative query may be suggested by the classifier component 120. In one example, the at least one alternative query suggested may include at least one of the textual query candidates in the n-best list of textual query candidates from the speech recognition component 110. In another example, the at least one alternative query suggested may include replacing the phonetically confusable segment of the textual query with a phonetically-similar term. For example, using an example described above, the phonetically confusable segment, "whales" of the textual query, "picture of whales," may be replaced with the phonetically-similar term, "wales," when suggesting the at least one alternative query. In yet another example, the at least one alternative query suggested may include replacing the phonetically confusable segment of the textual query with at least one feature identified in at least one of the dictionary store 122 and the context store 124. For example, in the session pair, "youtube," and "U2", the phonetically confusable segment "youtube" may be replaced by the feature "U2" identified in the dictionary store 122.

As discussed above, the voice-recognition system 100 may include an alteration component 130. In one aspect, the alteration component 130 may be configured to expand the textual query output by the speech recognition component 110 and/or the at least one alternative query. For example, if the textual query is "Bill Gates Bio," the alteration component 130 may expand the textual query, "Bill Gates Bio," to be "Bill Gates (bio or biography)" (e.g., "Bill Gates Biography"). As discussed above, the voice-recognition system 100 may include a UX (user experience) selector component 140. The UX selector component 140 may be configured to determine a layout for presenting a query, an alternative query and/or associated search results to the user 102, which will be discussed in more detail below relative to FIG. 2. In one case, the layout for presenting the query may be determined based on the output of the classifier component 120. In a first example, if the classifier component 120 determines not to suggest an alternative query, the UX selector component 140 may determine the layout for presenting the query to include the query and its associated search results. In a second example, if the classifier component 120 determines to suggest an alternative query, the UX selector component 140 may determine a layout that includes a best guess textual query candidate, its associated search results, and one or more alternative query suggestions. In this case, it may be determined that the best guess textual query candidate more likely reflects the intent of the user 102 than the alternative query suggestion. In a third example, if the classifier component 120 determines to suggest an alternative query, the UX selector component 140 may determine to use a split layout. In this case, it may be determined that the best guess textual query candidate and the alternative query suggestion similarly and/or equivalently reflect the intent of the user 102. As such, a first portion of the split layout may include the best guess textual query candidate and its associated search results. A second portion of the split layout may include the alternative query suggestion and its associated search results.

In one case, the layout for presenting a query, an alternative query and/or associated search results to the user 102 may include the best guess textual query candidate and its associated search results. In another case, the layout for presenting a query, an alternative query and/or associated search results to the user 102 may include a split layout. A first portion of the split layout may include the textual query (e.g., the best guess textual query candidate) and its associated search results. A second portion of the split layout may include an alternative query suggestion and its associated search results. In another case, the layout for presenting a query, an alternative query and/or associated search results to the user 102 may include the best guess textual query candidate, its associated search results, and one or more alternative query suggestions.

In aspects, the voice-recognition system 100 may be trained over time by processing spoken natural language expressions and suggesting alternative queries. For example, the voice-recognition system 100 may have an initial data set provided by data coming from user-system sessions. In one example, historical search sessions that include voice queries with reformulation queries may be mined. In one case, session reformulations where the first query is a voice query and the second query is a reformulated query (e.g., voice or text) that had phonetically similar terms based on its metaphones are extracted. The data that may be saved and stored for training the voice-recognition system 100 may include: (1) data where the first query did not have click data (e.g., a user did not click on any of the search results associated with the first query) but the reformulated query did have click data (e.g., a user did click on at least one of the search results associated with the reformulated query); and (2) reformulated queries that were typed by a user. A subset of the saved and stored data may be presented to human judges with an original recorded audio of the first query such that the human judges may rate the quality of the reformulated query as a potential alternative query suggestion. The data may be labeled and used to train the voice-recognition system 100. As the voice-recognition system processes and evaluates the spoken natural language expressions, alternative query suggestions, and user data (e.g., such as click data) the voice-recognition system 100 may aggregate the data for building the voice-recognition system 100 over time to be used for processing of future spoken natural language expressions. In turn, the voice-recognition system 100 may include a larger data set over time to facilitate providing more accurate and reliable alternative queries and/or search results.

Figure 2:
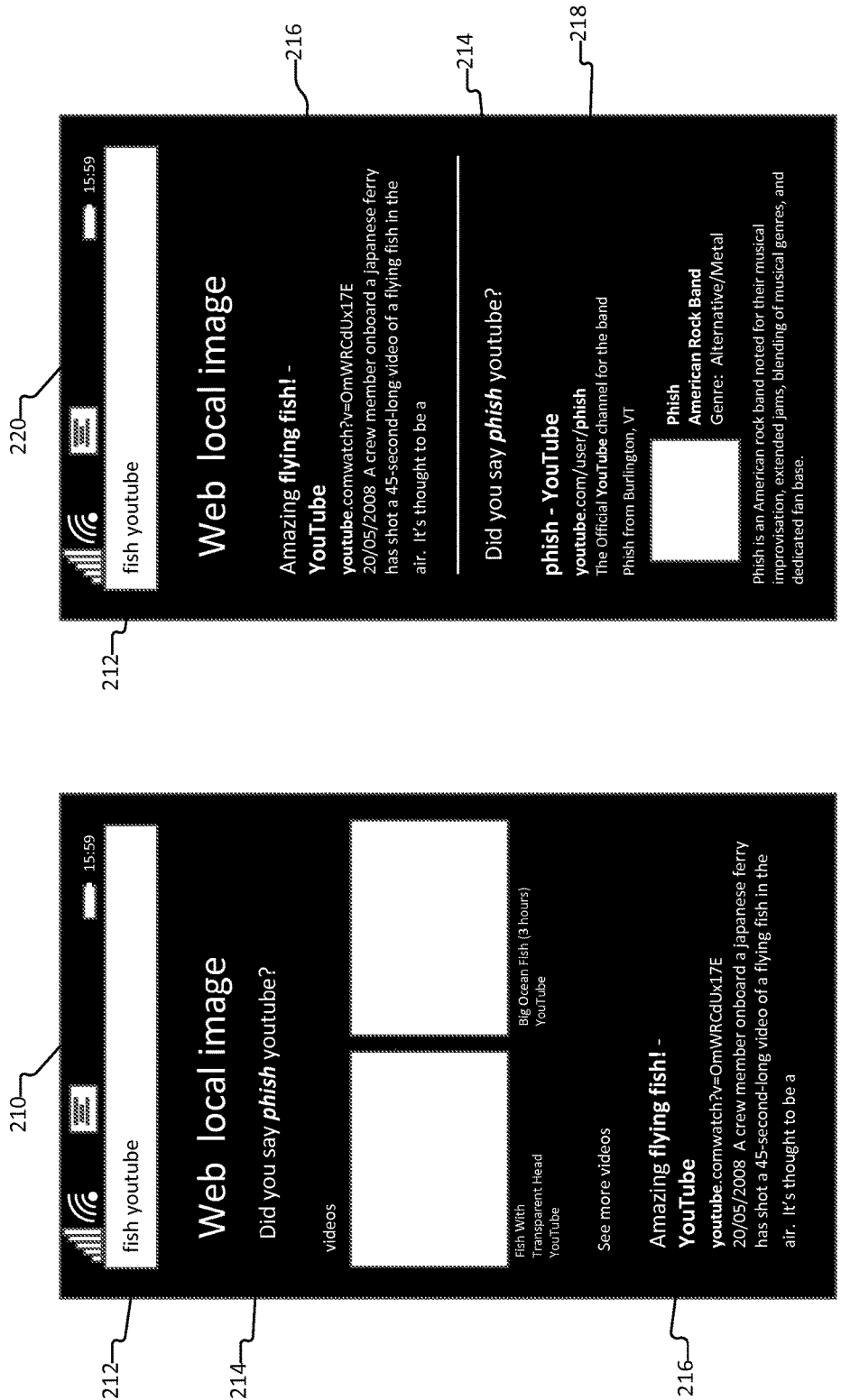
FIG. 2 illustrates a user interface display for interactive reformulation of voice queries, according to an example embodiment.

FIG. 2 illustrates a first user interface display 210 and a second user interface display 220 for interactive reformulation of voice queries, according to one or more aspects. The first user interface display 210 has a layout including a best guess textual query candidate 212, the best guess textual query candidate associated search results 216, and an alternative query suggestion 214. As illustrated in the first user interface display 210, the alternative query suggestion 214 includes the term, "phish" which is phonetically-similar to the term, "fish" in the best guess textual query candidate 212. The second user interface display 220 has a layout including a split layout. A first portion of the split layout may include the best guess textual query candidate 212 and the best guess textual query candidate 212 associated search results 216. A second portion of the split layout may include the alternative query suggestion 214 and the alternative query suggestion 214 associated search results 218. As discussed above, the first user interface display 210 and the second user interface display 220 may be presented on a client computing device 104. In aspects, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc.

Figure 3:
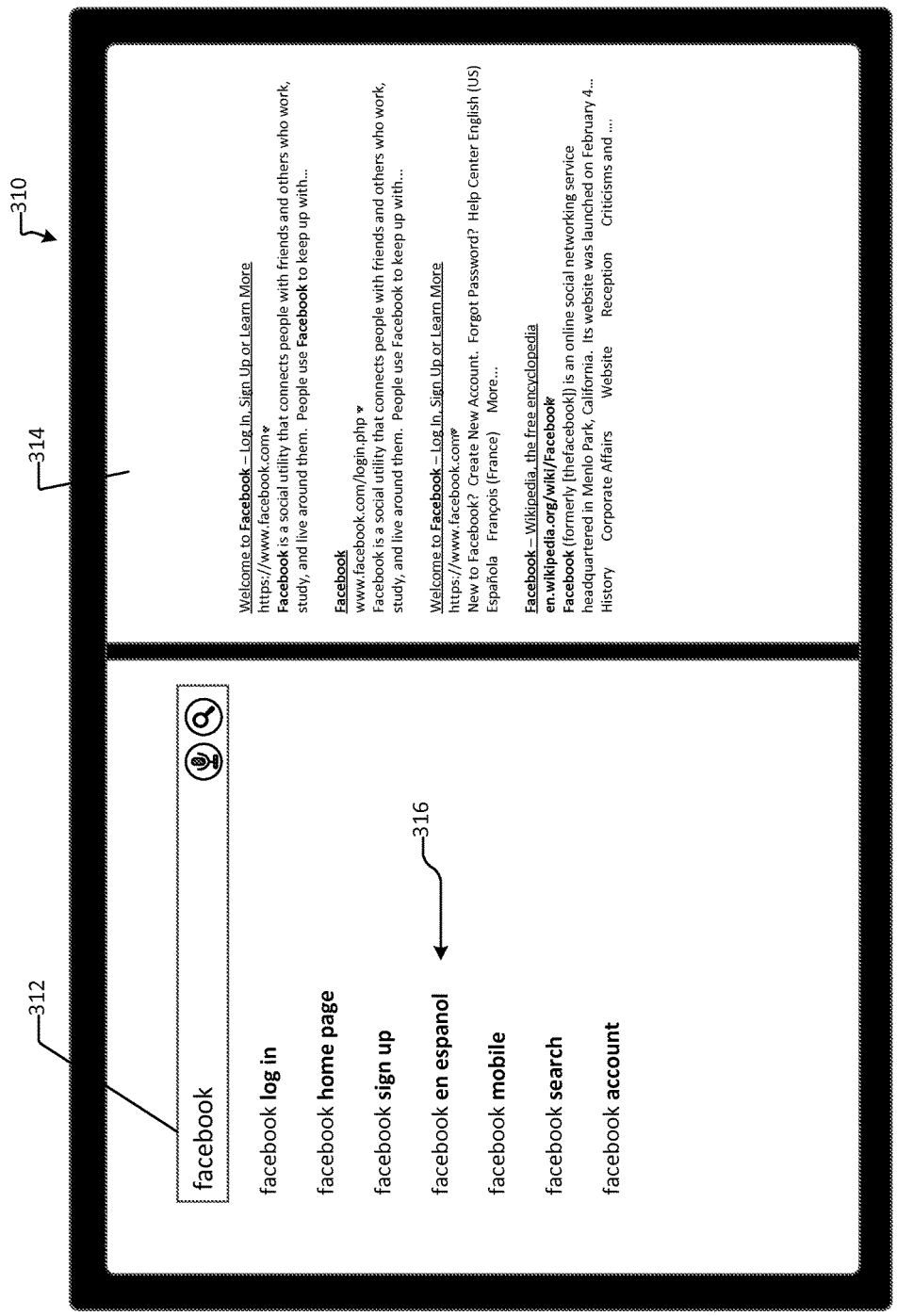
FIG. 3 illustrates a user interface display for displaying a best guess textual query candidate, according to an example embodiment.

FIG. 3 illustrates a user interface display 310 for displaying a best guess textual query candidate 312 and the best guess textual query candidate 312 associated search results 314 outputs from the speech recognition component 110. The user interface display 310 may also include one or more links 316 related to the best guess textual query candidate 312. The user interface display 310 illustrates the presentation of the textual query and the textual query associated results when the classifier component 120 determines that the speech recognition confidence score associated with the best guess textual query candidate 312 meets a threshold (e.g., has a high confidence score). As such, as illustrated in FIG. 3, an alternative query is not suggested in this example.

Figure 4:
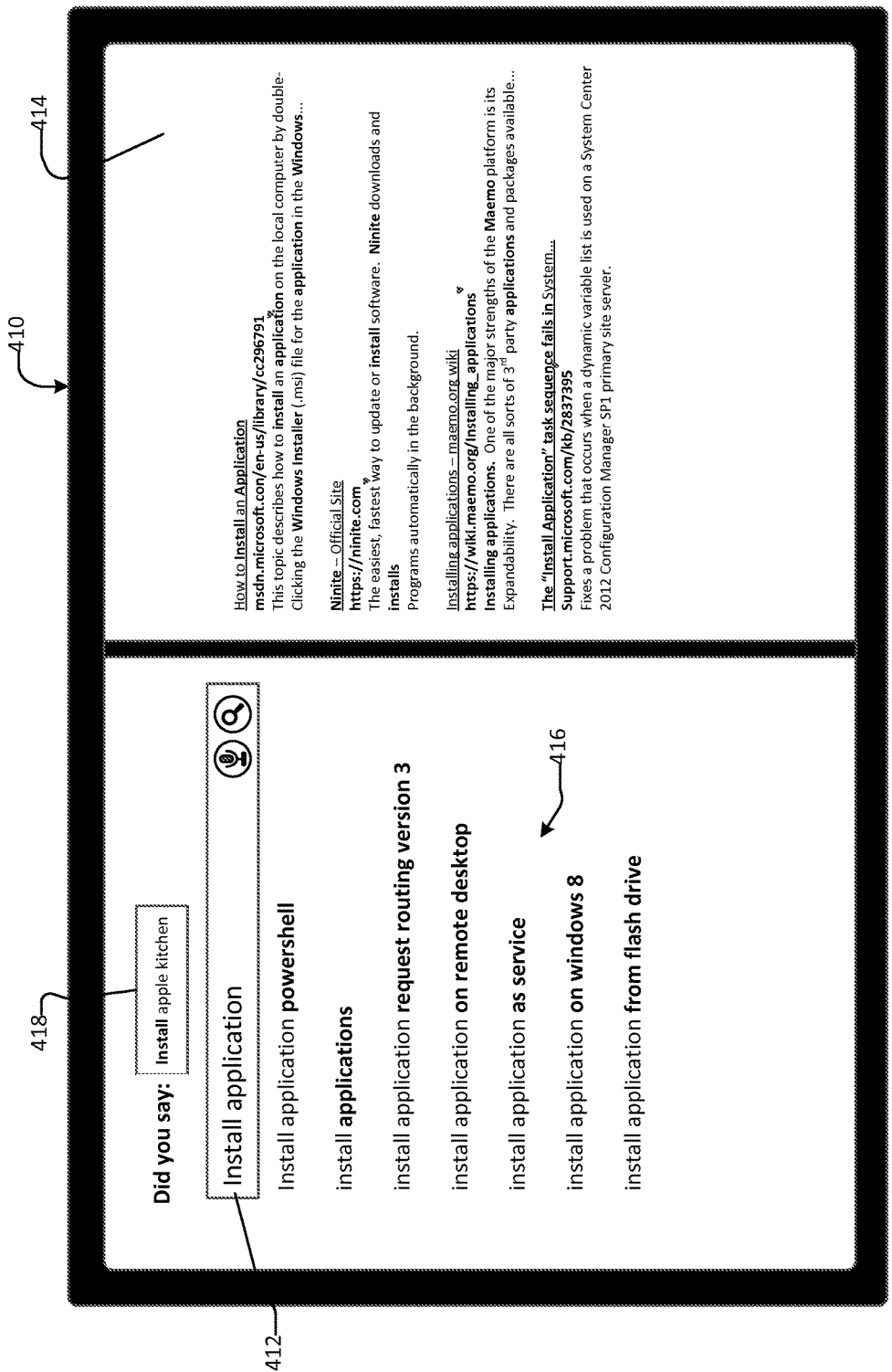
FIG. 4 illustrates a user interface display for displaying a first alternative query, according to an example embodiment.

FIG. 4 illustrates a user interface display 410 for displaying a first alternative query 412, the first alternative query 412 associated search results 414, and a second alternative query 418. For example, the spoken natural language expression may be, "install application." The speech recognition component 110 may convert the spoken natural language expression to the textual query, "install apple keychain." However, the speech recognition confidence score associated with the textual query "install apple keychain" may not meet a threshold (e.g., may be low). As such, the textual query "install apple keychain" may not be issued and displayed to the user 102. In this regard, the classifier component 120 may identify the segment, "apple keychain" of the textual query, "install apple keychain" as a phonetically confusable segment, as described above. When the segment, "apple keychain" of the textual query, "install apple keychain" is identified as a phonetically confusable segment, the classifier component 130 may determine whether to suggest at least one alternative query, as described above. In the example of FIG. 4, the classifier component 120 may determine to replace the phonetically confusable segment "apple keychain" with the term "application" and suggest the first alternative query 412 "install application" and associated search results 414. The classifier component 120 may determine to replace the phonetically confusable segment "apple keychain" with the term "apple kitchen" and suggest the second alternative query 418, "install apple kitchen." In this regard, the user 102 may select the second alternative query 418 if "install apple kitchen" was the intent of the user 102. The user interface display 310 may also include one or more links 416 related to the first alternative query 412. In one case, the one or more links 416 related to the first alternative query 412 may be based on historical search data/user reformulations obtained over time via user/system sessions.

Figure 5:
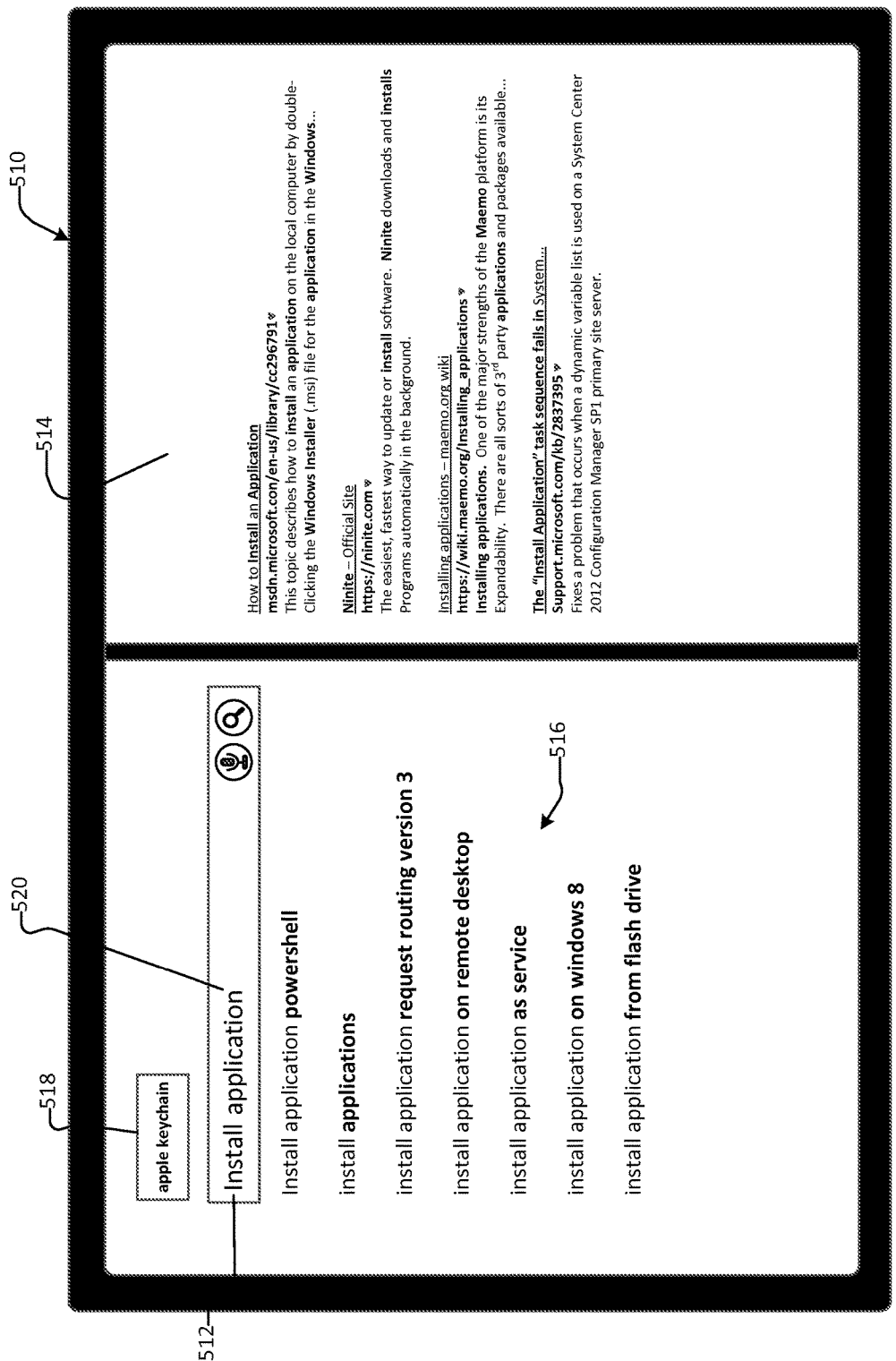
FIG. 5 illustrates a user interface display for displaying a first textual query, according to an example embodiment.

FIG. 5 illustrates a user interface display 510 for displaying a first textual query 512, the first textual query 512 associated search results 514, and an alternative query 518. For example, the classifier component 120 may identify the segment "application" in the first textual query 512 as a phonetically confusable segment and determine to replace the phonetically confusable segment, "application" with the term, "apple keychain," and suggest "apple keychain" as the alternative query 518. In one case, the alternative query 518 may be displayed on the user interface display 510 when the first textual query 512 is displayed on the user interface display 510. For example, as discussed above, the classifier component 120 may determine to suggest an alternative query and provide the alternative query with the textual query (e.g., best guess textual query candidate) output by the speech recognition component 110. In another case, the user 102 may select at least a segment of the first textual query 512 and an alternative query may be automatically suggested based on the selected segment of the first textual query 512. For example, when a user 102 selects the "application" segment 520, the alternative query 518 "apple keychain" may be displayed on the user interface display 510. In this regard, if the user 102 selects the alternative query 518, a reformulated query, "install apple keychain" may be generated and search results associated with the reformulated query, "install apple keychain" may be displayed on the user interface display 510. In this regard, the phonetically confusable segment, "application," may be replaced with alternative terms, "apple keychain" to create reformulated query.

In other aspects, the user 102 may select at least a segment of the first textual query 512 and an alternative query may be suggested based on receiving additional input from the user 102. For example, when a user 102 selects the "application" segment 520, the user may edit the selected segment via at least one of typing and a voice suggestion. When a voice suggestion is received for editing the selected segment, only the selected segment is replaced with the voice suggestion. In this regard, when the user 102 selects the segment 520 and issues a voice suggestion, "apple keychain," a reformulated query, "install apple keychain" may be generated and search results associated with the reformulated query, "install apple keychain" may be displayed on the user interface display 510 (replacing the phrase "install application"). In one example, when the alternative query 518 is displayed on the user interface display 510 with the first textual query 512, the user 102 may select the "application" segment 520 and subsequently select the alternative query 518 for replacing the "application" segment 520. In this regard, a reformulated query, "install apple keychain" may be generated and search results associated with the reformulated query, "install apple keychain" may be displayed on the user interface display 510. In aspects, the user interface display 510 may also include one or more links 516 related to the first query 512. In one case, the one or more links 516 related to the first textual query 512 may be based on historical search data/user reformulations obtained over time via user/system sessions.

As discussed above, the voice-recognition system 100 may be trained over time by processing spoken natural language expressions and suggesting alternative queries. In this regard, the voice-recognition system 100 may be trained through the interactive reformulation of queries, as described above relative to FIGS. 2-5. In some cases, positive and negative interactions may be defined for each user interface display. For example, a user 102 clicking on an alternative query suggestion provides positive feedback to the voice-recognition system 100. The positive feedback may indicate to the voice-recognition system 100 that the suggested alternative query was useful to the user 102. In another example, a user 102 clicking on search results associated with an alternative query suggestion provides positive feedback to the voice-recognition system 100. In yet another example, a user 102 clicking on search results associated with the textual query (e.g., best guess textual query candidate) output by the speech recognition component 110 provides negative feedback to the voice-recognition system 100. The negative feedback may indicate to the voice-recognition system 100 that the suggested alternative query was not useful to the user 102. In turn, the voice-recognition system 100 may be trained over time to include features and/or data collected through user interaction with multiple queries (e.g., speech recognition component 110 output queries and reformulated and/or alternative queries) and their associated search results. In turn, the voice-recognition system 100 may provide more accurate and reliable suggested alternative queries and/or search results and reduce and/or prevent repeating mistakes. By utilizing the voice-recognition system 100 of the present disclosure, a better user experience of the voice-recognition system 100 and/or an application associated with the voice-recognition system 100 (e.g., a digital assistant application) may be achieved. Additionally, the voice-recognition system 100 may reduce the number of clarifying requests/voice queries and/or responses the voice-recognition system 100 and/or application has to provide. As such, fewer computations may be required by the voice-recognition system 100, the client computing device 104 and/or the server computing device 108.

It is appreciated that the voice-recognition system 100 components (e.g., the speech recognition component 110, the classifier component 120, the alternation component 130, the UX selector component 140, the dictionary store 122, and the context store 124) may be located at the client computing device 104, the server computing device 108, and/or both the client computing device 104 and the server computing device 108 in any combination. For example, in one aspect, the client computing device 104 may include the speech recognition component 110, the classifier component 120, the alternation component 130, and the UX selector component 140 and the server computing device 108 may include the dictionary store 122, and the context store 124 in one configuration. This is exemplary only and should not be considered as limiting. Any suitable combination of voice-recognition system components at the client computing device 104 and the server computing device 108 for interactive reformulation of voice queries may be utilized.

Figure 6:
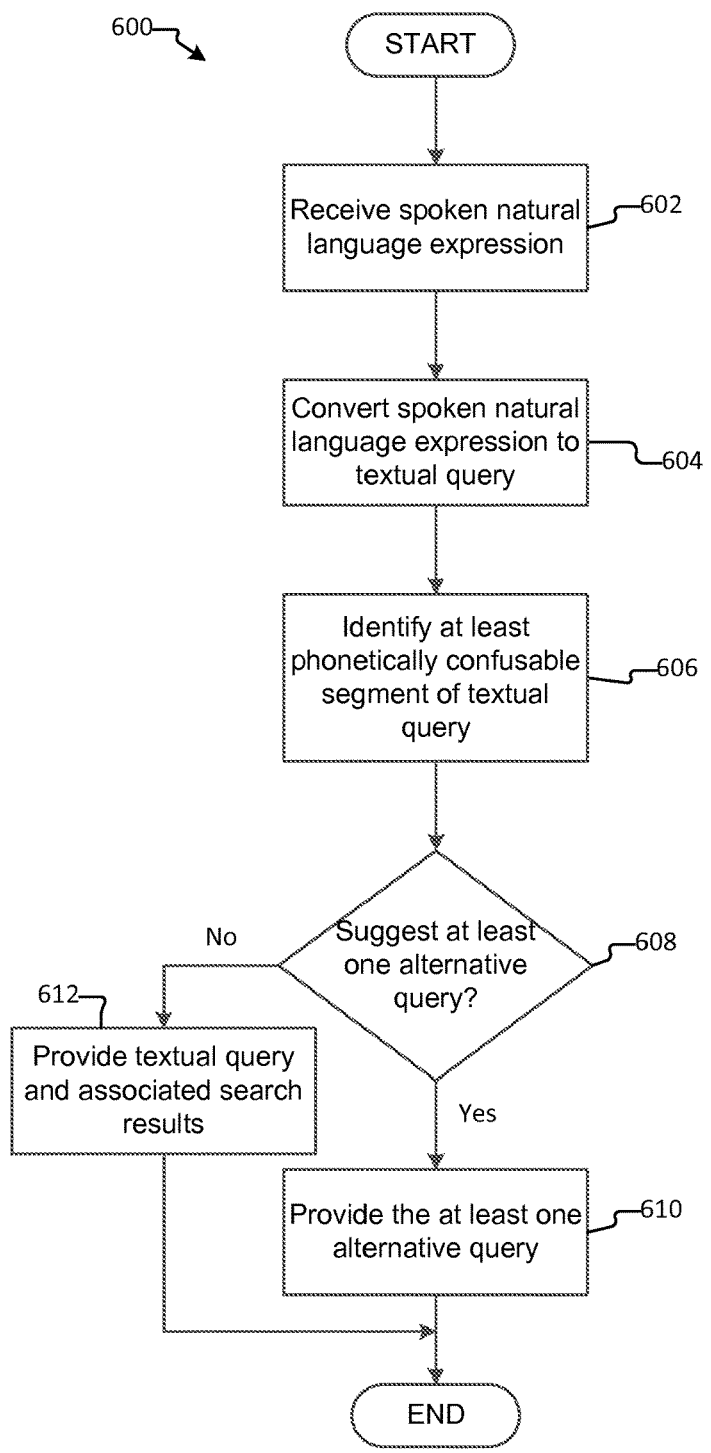
FIG. 6 illustrates an exemplary method for providing alternative query suggestions, according to an example embodiment.

FIG. 6 illustrates a method for providing alternative query suggestions according to one or more aspects of the present disclosure. Method 600 begins at operation 602 where a spoken natural language expression is received. For example, the spoken natural language expression may be received by a speech recognition component of the voice-recognition system for processing to convert the spoken natural language expression to a textual query. In one example, a natural language expression may include phrases, words, and/or terms in the form of a spoken language input (e.g., a user voice query and/or voice request).

When a spoken natural language expression is received at the speech recognition component, flow proceeds to operation 604 where the spoken natural language expression is converted to a textual query. For example, the speech recognition component may be configured to convert the spoken natural language expression to a textual query. In some cases, the speech recognition component may be configured to receive the spoken natural language expression and output a plurality of n-best textual query candidates (e.g., an n-best list of candidates) of the received spoken natural language expression. For example, the speech recognition component may receive the spoken natural language expression "install apple keychain," and output a first textual query candidate including, "install apple keychain," and a second textual query candidate including, "install apple kitchen." The speech recognition component may output speech recognition confidence scores associated with the n-best list of textual query candidates. For example, each speech recognition textual query candidate output by the speech recognition component may have an associated speech recognition confidence score. The speech recognition confidence score may indicate a confidence level of the accuracy of converting the spoken natural language expression to a textual query.

When the spoken natural language expression is converted to a textual query, flow proceeds to operation 606 where at least one phonetically confusable segment of the textual query is identified. In one aspect, a classifier component may be configured to identify at least a phonetically confusable segment of the textual query. Phonetically confusable may refer to homophone ambiguities. Homophone ambiguities are ambiguities found in speech, but not found in text (e.g., typing). For example, a homophone is a word that is pronounced the same as another word but differs in meaning. A homophone may also be a word that is pronounced the same as another word but differs in spelling. For example, the words, "whales," and "wales" are homophones. A phonetically confusable segment of the textual query may be any portion of the textual query including a word, term, or phrase of the textual query.

At decision operation 608, it is determined whether to suggest at least one alternative query. For example, the classifier component may determine whether to suggest at least one alternative query by utilizing historical data store in at least one of a dictionary store and a context store and/or by utilizing the n-best list of textual query candidates and their associated speech recognition confidence scores. In some cases, the historical data may be used to determine whether the at least one alternative query is sensical and/or useful. In some examples, the historical data may include co-occurrences of the textual query and the at least one alternative query (e.g., session pairs), session history, data, homophones, and the like.

If it is determined to suggest at least one alternative query based on determining that the at least one alternative query is sensical and/or useful, flow proceeds to operation 610 where the at least one alternative query is provided to a user interface display. In some cases, search results associated with the at least one alternative query may be provided to the user interface display. For example, a user may select the at least one alternative query on the user interface display. In response to the user selection of the at least one alternative query, search results associated with the at least one alternative query may be provided to the user interface display. If it is determined not to suggest the at least one alternative query based on determining that the at least one alternative query is nonsensical and/or not useful, flow proceeds to operation 612, where the textual query and search results associated with the textual query are provided to the user interface display.

Figure 7:
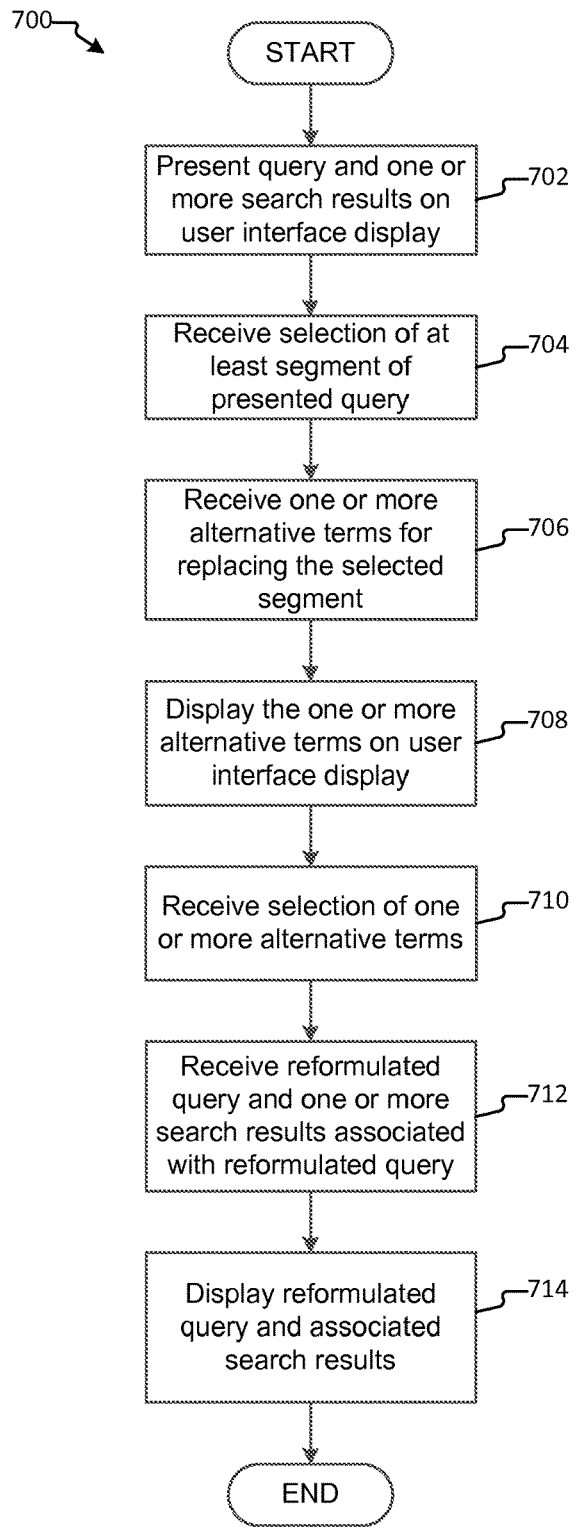
FIG. 7 illustrates an exemplary method for reformulation of speech queries, according to an example embodiment.

FIG. 7 illustrates a method for reformulation of speech queries, according to one or more embodiments of the present disclosure. Method 700 begins at operation 702 where a query and one or more search results associated with the query are presented on a user interface display of a client device. In some examples, the query may be the textual query and/or the best guess textual query candidate output by the speech recognition component. The user interface display may have a plurality of layouts. In one case, the layout for presenting a query, an alternative query and/or associated search results to the user may include the best guess textual query candidate and its associated search results. In another case, the layout for presenting a textual query, an alternative query and/or associated search results to the user may include a split layout. A first portion of the split layout may include the textual query (e.g., the best guess textual query candidate) and its associated search results. A second portion of the split layout may include an alternative query suggestion and its associated search results. In another case, the layout for presenting a textual query, an alternative query, a related query, and/or associated search results to the user may include the best guess textual query candidate, its associated search results, and one or more alternative query suggestions.

When a query and one or more search results associated with the query are presented on a user interface display of a client device, flow proceeds to operation 704 where a selection of at least a segment of the presented query is received on the user interface display. In some examples, a user may select at least a segment of the presented query and an alternative query may be suggested based on receiving additional input from the user. For example, when a user selects the "application" segment of a presented query, "install application," the user may edit the selected segment via at least one of typing and a voice suggestion.

When a selection of at least a segment of the presented query is received on the user interface display, flow proceeds to operation 706, where one or more alternative terms for replacing the selected segment of the presented query are received at the client device. For example, a user may select at least a segment of the presented query and one or more alternative terms may be automatically suggested based on the selected segment of the presented query (using the methods/techniques described herein (e.g., historical data, session pairs, speech recognition scores, and the like). For example, when a user selects the "application" segment of the presented query, "install application," the alternative terms "apple keychain" may be displayed on the user interface display.

When one or more alternative terms for replacing the selected segment of the presented query are received at the client device, flow proceeds to operation 708 where the one or more alternative terms are displayed on the user interface display of the client device. For example, the layout of the user interface display may include the best guess textual query candidate, its associated search results, and one or more alternative queries.

At operation 710, a selection of one or more alternative terms displayed on the user interface display of the client device is received. For example, the alternative terms "apple keychain" may be displayed above, below or next to the presented query as a button, icon, etc., that may be selected by the user. When a selection of one or more alternative terms displayed on the user interface display of the client device is received, flow proceeds to operation 712 where a reformulated query and one or more search results associated with the reformulated query are received. In one example, the reformulated query includes the presented query with the selected segment of the presented query replaced with the selection one or more alternative terms. In this regard, if the user selects the alternative terms, a reformulated query, "install apple keychain" may be generated and search results associated with the reformulated query, "install apple keychain" may be displayed on the user interface display. In this regard, the phonetically confusable segment, "application," may be replaced with alternative terms, "apple keychain" to create reformulated query. In one case, the phonetically confusable segment, "application" and the alternative terms, "apple keychain" may be stored as a session pair in the dictionary store.

When the reformulated query and one or more search results associated with the reformulated query are received, flow proceeds to operation 714 where the reformulated query and the search results associated with the reformulated query are displayed on the user interface display. In one example, the search results associated with the reformulated query may replace the search results associated with the presented query that were previously displayed.

Figure 8:
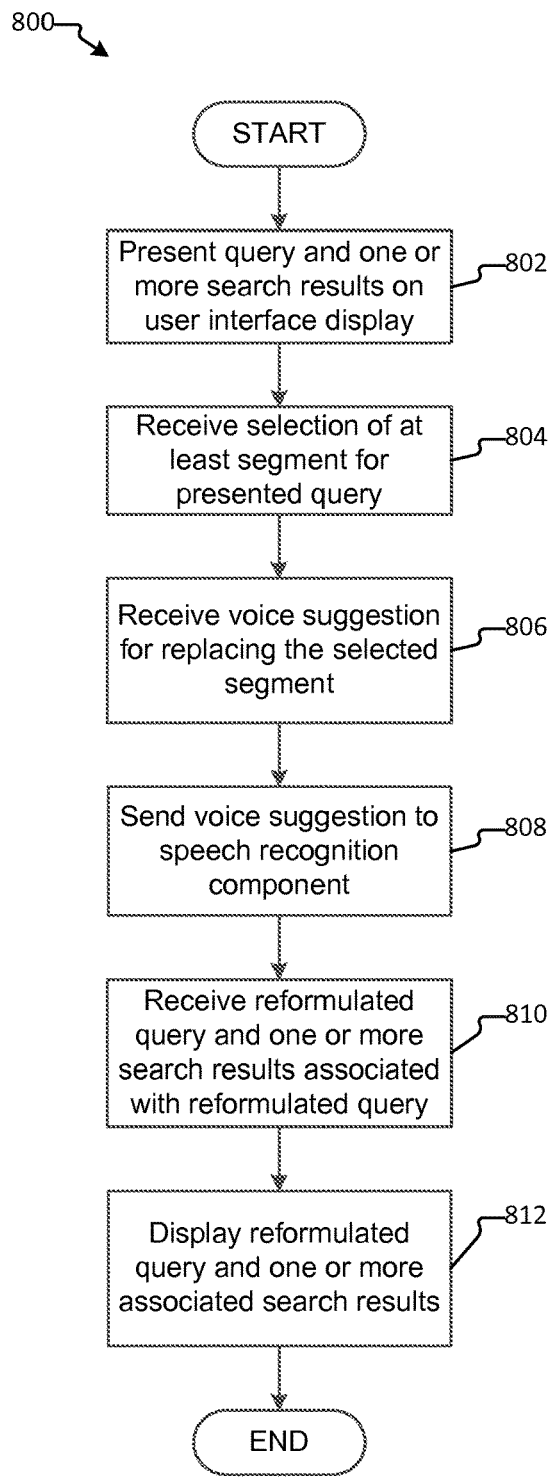
FIG. 8 illustrates an exemplary method for reformulation of speech queries, according to an example embodiment.

FIG. 8 illustrates a method for reformulation of speech queries, according to one or more embodiments of the present disclosure. Method 800 begins at operation 802 where a query and one or more search results associated with the query are presented on a user interface display of a client device. In some examples, the query may be the textual query and/or the best guess textual query candidate output by the speech recognition component. The user interface display may have a plurality of layouts. In one case, the layout for presenting a query, an alternative query and/or associated search results to the user may include the best guess textual query candidate and its associated search results. In another case, the layout for presenting a query, an alternative query and/or associated search results to the user may include a split layout. A first portion of the split layout may include the textual query (e.g., the best guess textual query candidate) and its associated search results. A second portion of the split layout may include an alternative query suggestion and its associated search results. In another case, the layout for presenting a query, an alternative query, a related query, and/or associated search results to the user may include the best guess textual query candidate, its associated search results, and one or more alternative query suggestions.

When a query and one or more search results associated with the query are presented on a user interface display of a client device, flow proceeds to operation 804 where a selection of at least a segment of the presented query is received on the user interface display. In some examples, a user may select at least a segment of the presented query and an alternative query may be suggested based on receiving additional input from the user. For example, when a user selects the "application" segment of a presented query, "install application," the user may edit the selected segment via at least one of typing and a voice suggestion.

When a selection of at least a segment of the presented query is received on the user interface display, flow proceeds to operation 806, where a voice suggestion for replacing the selected segment is received. When a voice suggestion is received for editing the selected segment, only the selected segment is replaced with the voice suggestion. In this regard, if the user selects the "application" segment and issues a voice suggestion, "apple keychain," the "application segment" is replaced with "apple keychain." As such, a reformulated query, "install apple keychain" may be generated and search results associated with the reformulated query, "install apple keychain" may be displayed on the user interface display.

When where a voice suggestion for replacing the selected segment is received, flow proceeds to operation 808 where the voice suggestion is sent to the speech recognition component for processing. The speech recognition component may convert the voice suggestion to a textual query. In some cases, the speech recognition component may be configured to output a plurality of n-best textual query candidates (e.g., an n-best list of candidates) of the voice query. For example, the speech recognition component may receive the voice query "apple keychain," and output a first textual query candidate including, "apple keychain," and a second textual query candidate including, "apple kitchen."

In an aspect, a selection of one of the plurality of n-best textual query candidate may be received, e.g., the first textual query candidate "apple keychain" or the second textual query candidate "apple kitchen." When a selection is received, flow proceeds to operation 810 where a reformulated query and one or more search results associated with the reformulated query are received. In one example, the reformulated query includes the presented query with the selected segment of the presented query replaced with the selection textual query candidate. In this regard, if the user selects the first textual query candidate, a reformulated query "install apple keychain" may be generated and search results associated with the reformulated query, "install apple keychain" may be displayed on the user interface display. In this regard, the phonetically confusable segment, "application," may be replaced with "apple keychain" to create reformulated query.

When the reformulated query and one or more search results associated with the reformulated query are received, flow proceeds to operation 812 where the reformulated query and the search results associated with the reformulated query are displayed on the user interface display. In one example, the search results associated with the reformulated query may replace the search results associated with the presented query that were previously displayed. In some cases, the search results may be stored for training the voice-recognition system.

Figure 9:
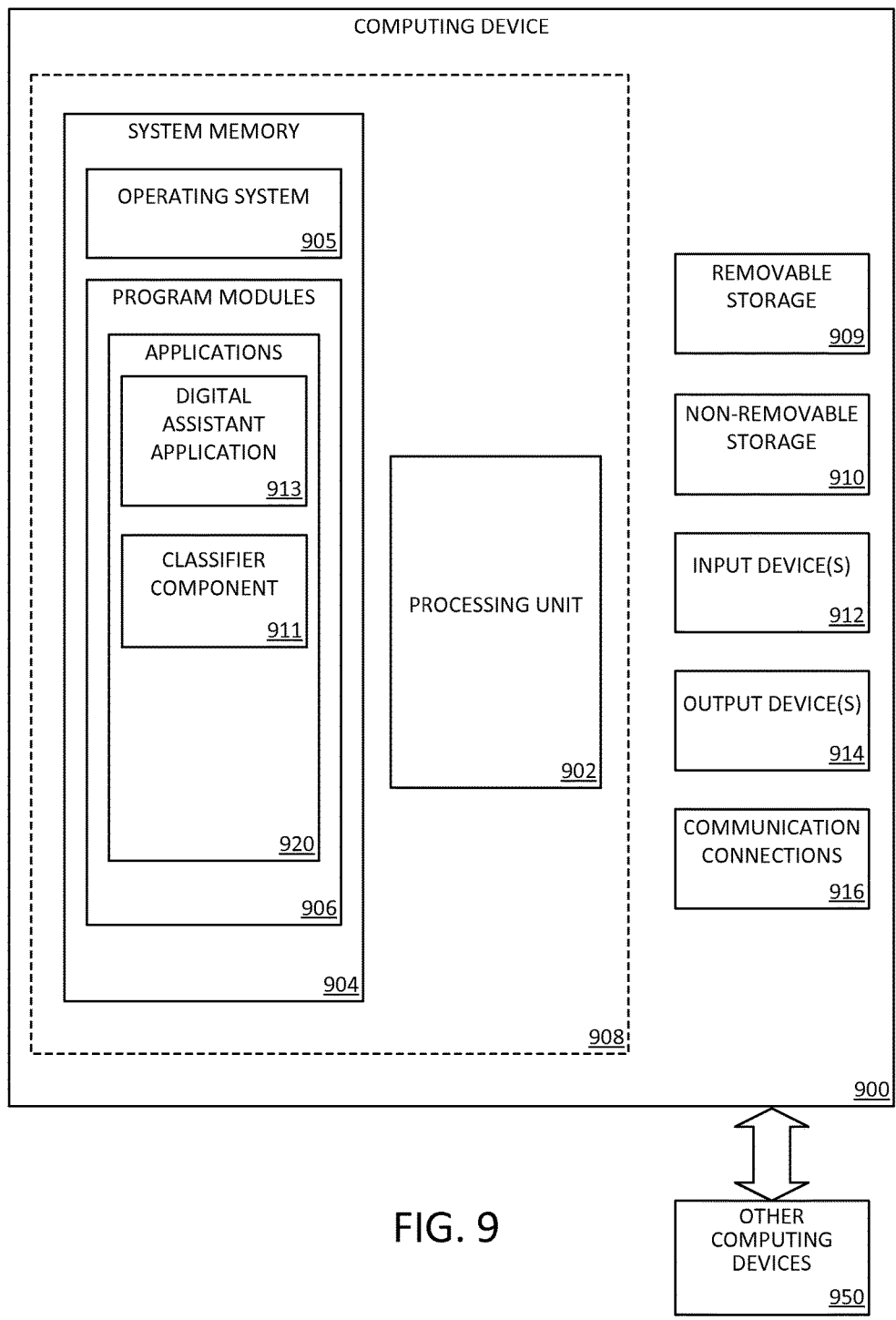
FIG. 9 is a block diagram illustrating example physical components of a computing device with which embodiments of the disclosure may be practiced.

FIGS. 9-12 and the associated descriptions provide a discussion of a variety of operating environments in which aspects of the disclosure may be practiced. However, the devices and systems illustrated and discussed with respect to FIGS. 9-12 are for purposes of example and illustration and are not limiting of a vast number of computing device configurations that may be utilized for practicing embodiments of the disclosure, described herein FIG. 9 is a block diagram illustrating physical components (e.g., hardware) of a computing device 900 with which aspects of the disclosure may be practiced. The computing device components described below may have computer executable instructions for a digital assistant application 913, e.g., of a client and/or computer, executable instructions for contextual language understanding module 911, e.g., of a client, that can be executed to employ the methods 600 through 800 disclosed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running software applications 920 such as voice-recognition applications in regards to FIG. 1 and, in particular, digital assistant application 913 or classifier component 911. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., classifier component 911 or digital assistant application 913) may perform processes including, but not limited to, the aspects, as described herein. Other program modules that may be used in accordance with aspects of the present disclosure, and in particular for providing alternative query suggestions, may include machine learning models, speech recognition models, UX selector models, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 918. Examples of suitable communication connections 916 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
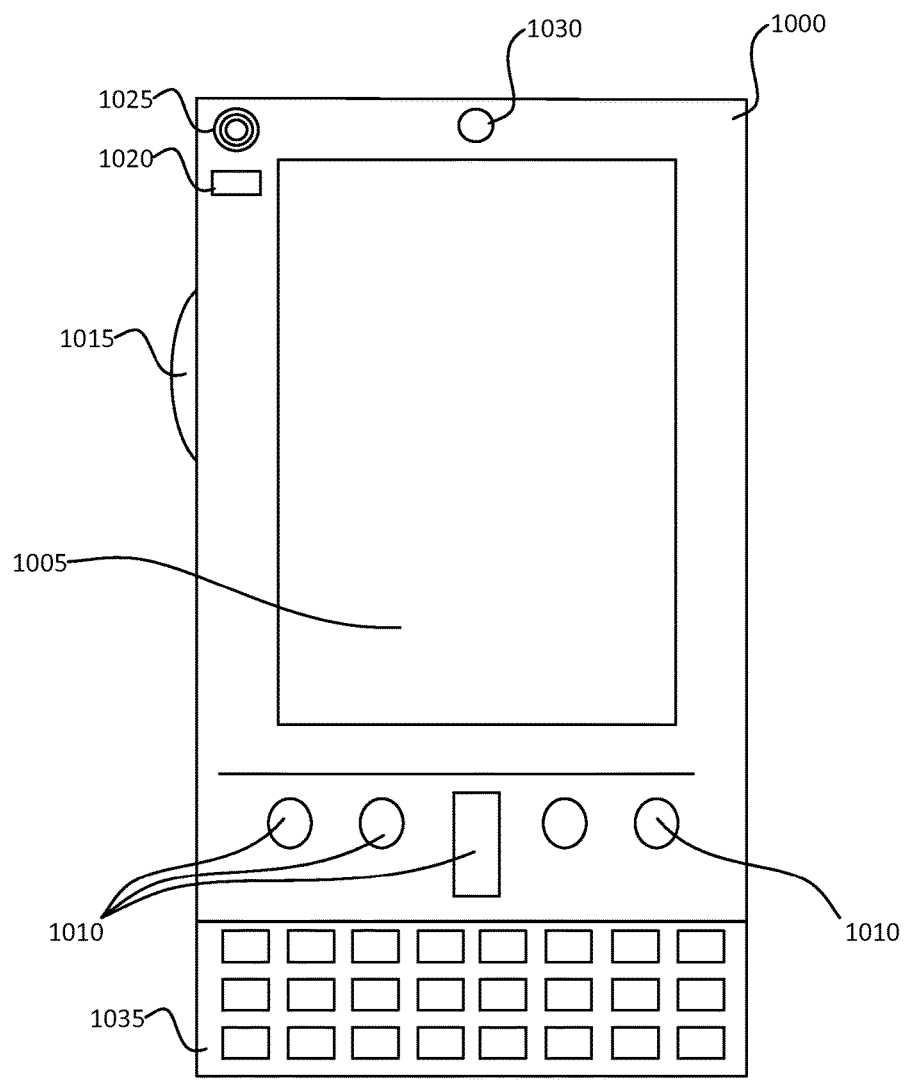
FIGS. 10A and 10B are simplified block diagrams of a mobile computing device with which embodiments of the present disclosure may be practiced.
Figure 10B:
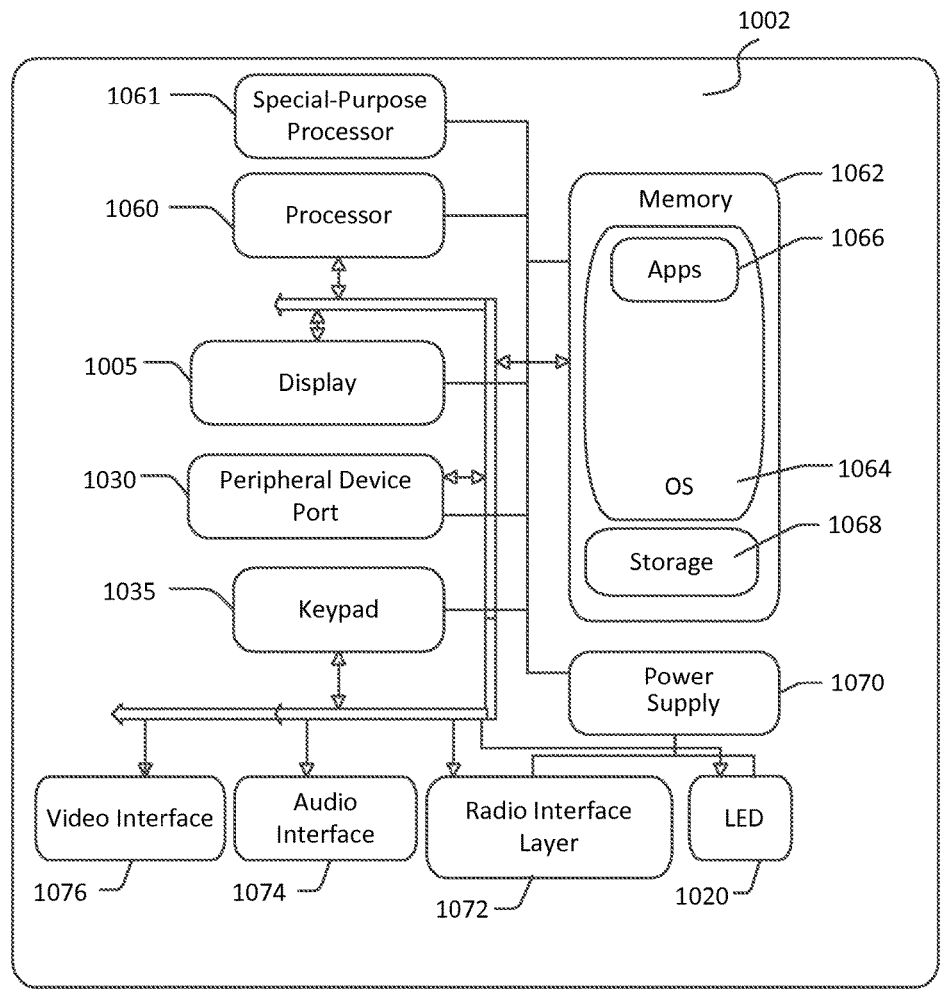

FIGS. 10A and 10B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 802 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including the instructions for providing alternative query suggestions as described herein (e.g., and/or optionally classifier component 911).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio 1072 that performs the function of transmitting and receiving radio frequency communications. The radio 1072 facilitates wireless connectivity between the system 1002 and the "outside world," via a communications carrier or service provider. Transmissions to and from the radio 1072 are conducted under control of the operating system 864. In other words, communications received by the radio 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 868.

Data/information generated or captured by the mobile computing device 800 and stored via the system 1002 may be stored locally on the mobile computing device 1000, as described above, or the data may be stored on any number of storage media that may be accessed by the device via the radio 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio 1072 or via a distributed computing network. Similarly, such data/information may be readily transferred between computing devices for storage and use according to well-known data/information transfer and storage means, including electronic mail and collaborative data/information sharing systems.

Figure 11:
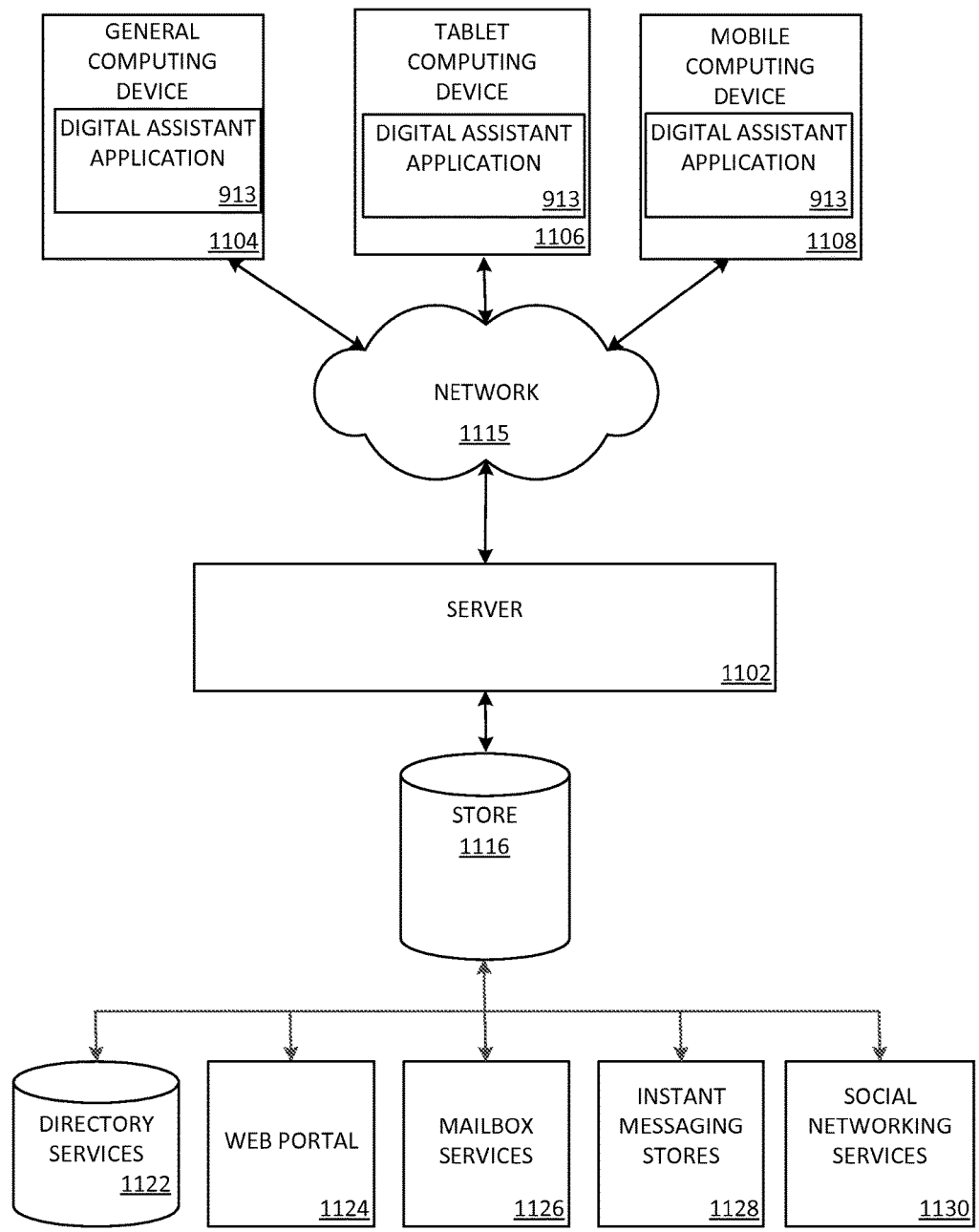
FIG. 11 is a simplified block diagram of a distributed computing system in which embodiments of the present disclosure may be practiced.

FIG. 11 illustrates one aspect of the architecture of a system for processing data received at a computing system from a remote source, such as a computing device 1104, tablet 1106, or mobile device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. The digital assistant application 913 may be employed by a client who communicates with server 1102. The server 1102 may provide data to and from a client computing device such as a personal computer 1104, a tablet computing device 1106 and/or a mobile computing device 1108 (e.g., a smart phone) through a network 1115. By way of example, the computer system described above with respect to FIGS. 1-5 may be embodied in a personal computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Figure 12:
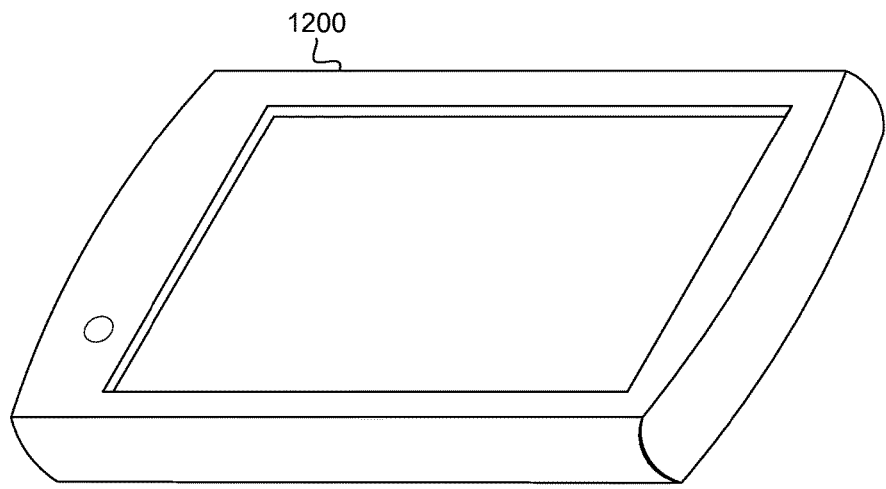
FIG. 12 illustrates a tablet computing device for executing one or more embodiments of the present disclosure.

FIG. 12 illustrates an exemplary tablet computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Among other examples, the present disclosure presents systems for providing alternative query suggestions comprising: receiving a spoken natural language expression, wherein the spoken natural language expression includes at least one of words, terms, and phrases; converting the spoken natural language expression to a textual query; identifying at least a phonetically confusable segment of the textual query; determining whether to suggest at least one alternative query; and upon determining to suggest the at least one alternative query, providing the at least one alternative query to a user interface display. In further examples, identifying at least the phonetically confusable segment of the textual query comprises using at least one of metaphones, historical data, and a plurality of speech recognition confidence scores. In further examples, the system further comprises determining whether a speech recognition confidence score associated with a best guess textual query candidate meets a threshold. In further examples, when it is determined that the speech recognition confidence score meets the threshold, the method further comprising returning search results associated with the best guess textual query candidate. In further examples, determining whether to suggest the at least one alternative query comprises determining whether the at least one alternative query is sensical. In further examples, determining whether to suggest the at least one alternative query comprises determining whether the at least one alternative query is useful. In further examples, determining whether to suggest the at least one alternative query comprises identifying co-occurrences of the textual query and the at least one alternative query in a dictionary store. In further examples, determining whether to suggest the at least one alternative query comprises determining whether the at least one alternative query provides search results that are different than search results provided by the textual query. In further examples, the at least one alternative query includes at least one of a plurality of textual query candidates. In further examples, the at least one alternative query includes replacing the phonetically confusable segment of the textual query with a phonetically-similar term. In further examples, the at least one alternative query includes replacing the phonetically confusable segment of the textual query with at least one feature identified in at least one of a context store and a dictionary store.

Further aspects disclosed herein provide an exemplary system for interactive reformulation of speech queries comprising: presenting a query and one or more search results associated with the query on a user interface display of a client device; receiving a selection of a segment of the presented query on the user interface display; receiving, at the client device, a voice suggestion for replacing the selected segment of the presented query; and displaying one or more alternative terms corresponding to the voice suggestion on the user interface display of the client device. In further examples, the system further comprises receiving a selection of at least one of the one or more alternative terms displayed on the user interface display of the client device; replacing, at the client device, the selected segment with the selected at least one alternative term to provide a reformulated query; receiving one or more search results associated with the reformulated query; and displaying the reformulated query and the one or more search results associated with the reformulated query on the user interface display of the client device. In further examples, the system further comprises sending the voice suggestion to a speech recognition component; and receiving, at the client device, a reformulated query and one or more search results associated with the reformulated query, wherein the reformulated query includes the presented query with the selected segment of the presented query replaced with one or more alternative terms corresponding to the voice suggestion. In further examples, the one or more alternative terms corresponding to the voice suggestion are identified based on metaphones, historical data, and a plurality of speech recognition confidence scores. In further examples, the presented query is a best guess textual query from a speech recognition component. In further examples, the presented query is an alternative query suggested by a classifier component.

Additional aspects disclosed herein provide exemplary systems and methods for interactive reformulation of speech queries, the method comprising: presenting a query and one or more search results associated with the query on a user interface display of a client device; receiving a selection of at least a segment of the presented query on the user interface display; receiving, at the client device, a voice suggestion for replacing the selected segment of the presented query; sending the voice suggestion to a speech recognition component; receiving, at the client device, a reformulated query and one or more search results associated with the reformulated query, wherein the reformulated query includes the presented query with the selected segment of the presented query replaced with a textual representation of the voice suggestion; and displaying the reformulated query and the one or more search results associated with the reformulated query on the user interface display of the client device. In further examples, the method further comprises receiving one or more alternative query suggestions to the reformulated query. In further examples, the method further comprises receiving, at the client device, one or more alternative terms for replacing the selected segment of the presented query; and displaying the one or more alternative terms on the user interface display of the client device.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory encoding computer executable instructions that, when executed by at least one processor, cause the at least one processor to perform a method for providing alternative query suggestions, the method comprising:
   receiving a spoken natural language expression;
   converting the spoken natural language expression to a textual query;
   identifying at least a phonetically confusable segment of the textual query, wherein identifying the phonetically confusable segment of the textual query comprises determining a context of the textual query, wherein the context is associated with a topic of the textual query;
   identifying at least one alternative query, wherein the at least one alternative query is homophonically related to the phonetically confusable segment of the textual query;
   determining whether the at least one alternative query makes logical sense based on the context by evaluating the at least one alternative query against a context store by measuring engagement of the at least one alternative query; and
   upon determining the at least one alternative query makes logical sense, providing the at least one alternative query to a user interface display.

2. The system of claim 1, wherein identifying at least the phonetically confusable segment of the textual query comprises using at least one of metaphones, historical data, and a plurality of speech recognition confidence scores.

3. The system of claim 1, further comprising determining whether a speech recognition confidence score associated with a best guess textual query candidate meets a threshold.

4. The system of claim 3, wherein when it is determined that the speech recognition confidence score meets the threshold, the method further comprising returning search results associated with the best guess textual query candidate.

5. The system of claim 1, wherein determining whether to suggest the at least one alternative query comprises determining whether the at least one alternative query is useful.

6. The system of claim 1, wherein determining whether to suggest the at least one alternative query comprises identifying co-occurrences of the textual query and the at least one alternative query in a dictionary store.

7. The system of claim 1, wherein determining whether to suggest the at least one alternative query comprises determining whether the at least one alternative query provides search results that are different than search results provided by the textual query.

8. The system of claim 1, wherein the at least one alternative query includes at least one of a plurality of textual query candidates.

9. The system of claim 1, wherein the at least one alternative query includes replacing the phonetically confusable segment of the textual query with a phonetically-similar term.

10. The system of claim 1, wherein the at least one alternative query includes replacing the phonetically confusable segment of the textual query with at least one feature identified in at least one of a context store and a dictionary store.

11. A system comprising:
    at least one processor; and
    memory encoding computer executable instructions that, when executed by at least one processor, cause the at least one processor to perform a method for interactive reformulation of speech queries, the method comprising:
    presenting a query and one or more search results associated with the query on a user interface display of a client device;
    receiving a selection of a segment of the presented query on the user interface display;

receiving, at the client device, a voice suggestion for replacing the selected segment of the presented query, wherein the voice suggestion and the selected segment are recorded as an associated pair; and displaying one or more alternative terms corresponding to the voice suggestion on the user interface display of the client device, wherein the one or more alternative terms make logical sense when evaluated against a context of the presented query, wherein evaluating the context of the presented query comprises comparing the one or more alternative terms to historical data in a context store by measuring engagement of one or more of alternative terms.

12. The system of claim 11, further comprising:

receiving a selection of at least one of the one or more alternative terms displayed on the user interface display of the client device;

replacing, at the client device, the selected segment with the selected at least one alternative term to provide a reformulated query;

receiving one or more search results associated with the reformulated query; and displaying the reformulated query and the one or more search results associated with the reformulated query on the user interface display of the client device.

13. The system of claim 11, further comprising:

sending the voice suggestion to a speech recognition component; and receiving, at the client device, a reformulated query and one or more search results associated with the reformulated query, wherein the reformulated query includes the presented query with the selected segment of the presented query replaced with one or more alternative terms corresponding to the voice suggestion.

14. The system of claim 13, wherein the one or more alternative terms corresponding to the voice suggestion are identified based on metaphors, historical data, and a plurality of speech recognition confidence scores.

15. The system of claim 11, wherein the presented query is a best guess textual query from a speech recognition component.

16. The system of claim 11, wherein the presented query is an alternative query suggested by a classifier component.

17. A method for interactive reformulation of speech queries including at least one processor, and memory encoding computer executable instructions that, when executed by at least one processor, cause the at least one processor to perform the method, the method comprising:

presenting a query and one or more search results associated with the query on a user interface display of a client device;

receiving a selection of at least a segment of the presented query on the user interface display;

receiving, at the client device, a voice suggestion for replacing the selected segment of the presented query, wherein the voice suggestion and the selected segment are recorded as an associated pair;

sending the voice suggestion to a speech recognition component;

receiving, at the client device, a reformulated query and one or more search results associated with the reformulated query, wherein the reformulated query includes the presented query with the selected segment of the presented query replaced with a textual representation of the voice suggestion, and wherein the reformulated query makes logical sense when evaluated against a topical context of the presented query by measuring engagement of the reformulated query; and displaying the reformulated query and the one or more search results associated with the reformulated query on the user interface display of the client device.

18. The method of claim 17, further comprising receiving one or more alternative query suggestions to the reformulated query.

19. The method of claim 17, further comprising:

receiving, at the client device, one or more alternative terms for replacing the selected segment of the presented query; and displaying the one or more alternative terms on the user interface display of the client device.

\* \* \* \* \*